Nov. 10, 1936. P. PETERSON 2,060,527
COMBINED FENDER AND LAMP HOUSING
Original Filed Jan. 7, 1936  2 Sheets-Sheet 1

Inventor
Peter Peterson
By Braselton Whitcomb & Davies
Attorneys

Nov. 10, 1936.   P. PETERSON   2,060,527
COMBINED FENDER AND LAMP HOUSING
Original Filed Jan. 7, 1936   2 Sheets-Sheet 2
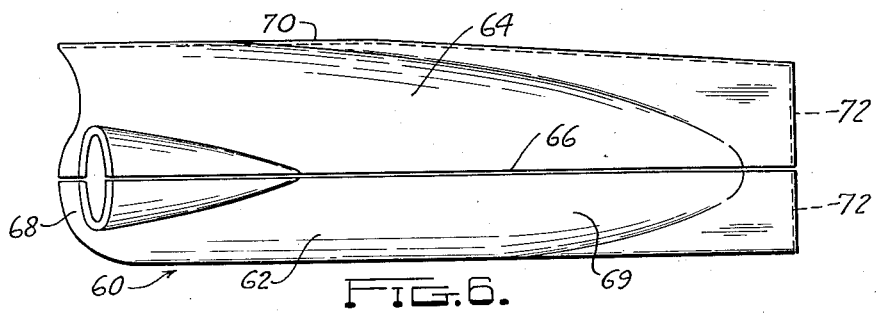
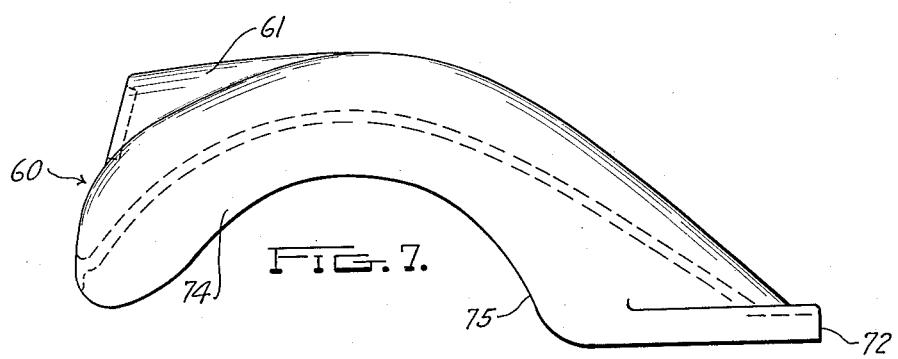
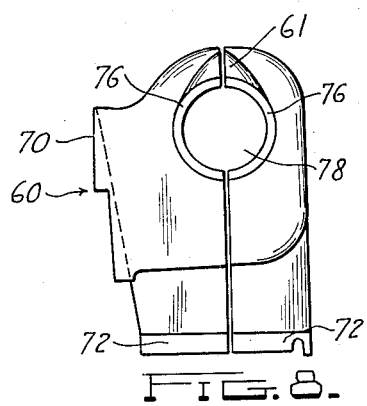
Inventor
Peter Peterson
By Braselton Whitcomb & Davies
Attorneys Patented Nov. 10, 1936

2,060,527

UNITED STATES PATENT OFFICE 2,060,527

COMBINED FENDER AND LAMP HOUSING

Peter Peterson, Toledo, Ohio, assignor to The City Auto Stamping Company, Toledo, Ohio, a corporation of Ohio Original application January 7, 1936, Serial No. 57,973. Divided and this application June 4, 1936, Serial No. 83,526

6 Claims. (Cl. 280—152)

This invention relates to a novel vehicle fender construction and is more particularly directed to a specially combined fender and lamp housing and the method of making the same, and is a division of my copending application, Serial No. 57,973, filed January 7, 1936.

An object of the invention resides in the provision of a sectional fender and lamp housing wherein portions of the lamp housing are integrally formed in the several fender sections and secured together to impart a unitary appearance to the finished structure eliminating expense, prior steps and methods used in combining separate lamp housings to the fenders and then finishing the joint.

The invention contemplates a method of forming an article of this character wherein a single weld or other union joins the sections together into a substantially unitary structure.

A further object of the invention resides in the provision of a fender and lamp housing, the sections of which are preferably formed, trimmed, flanged and pierced prior to their assembly.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawings of a form of the invention, which may be preferred, in which:

Figure 6 is a top plan view of a fender structure showing another form of the invention;

Figure 7 is a side view of the fender shown in Figure 6;

Figure 8 is a front view of the fender shown in Figures 6 and 7.

Figure 1:
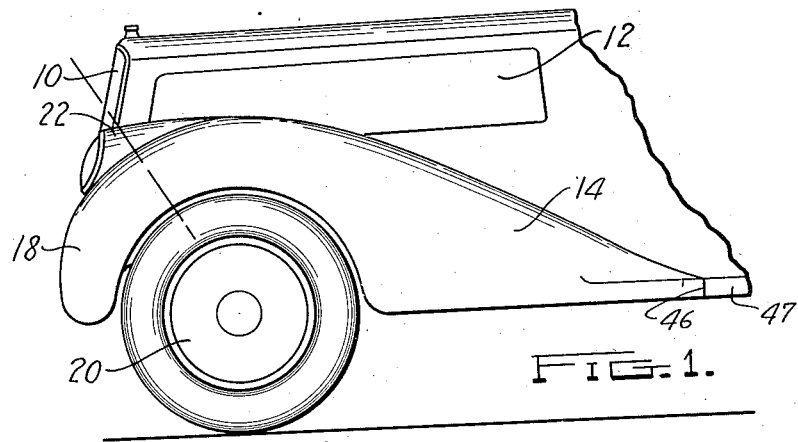
Figure 1 is a fragmentary side view of the front portion of an automotive vehicle showing the invention as incorporated in a front fender of the vehicle.
Figure 2:
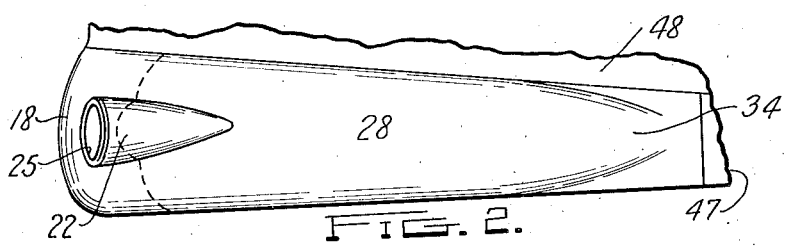
Figure 2 is a top view of the fender structure shown in Figure 1.

Although I have illustrated the invention as incorporated for use in connection with automotive vehicles, it is to be understood that I contemplate its use wherever the same may be found to have utility.

Referring to the drawings, 10 is a radiator enclosure or shield; 12 is an engine hood projecting rearwardly from the shield 10; and 14 is the fender structure incorporating the present invention.

Heretofore it has been the practice to make a combined fender and lamp housing by stamping out a conventional fender and then cutting an opening in the crown thereof to receive a separately formed lamp housing. This method necessitates the welding of the lamp housing in the fender opening and in most cases it is necessary that the parts be blended together by filling in the joints with metal until the desired contour is obtained. Such a method involves numerous operations resulting in great expense, and due to the necessity of handling the entire structure to perform the various finishing operations as well as assembly, few automobile manufacturers have used this type of fender.

To overcome these objections and reduce the expense of making this type of fender, the fender and lamp housing hereinafter described is formed of several sections which are secured together in an efficient inexpensive manner. As shown in Figure 1, the fender 14 is suitably secured to a convenient part of the vehicle, and includes a front or nose portion 18 projecting forwardly and downwardly to overhang a portion of the wheel 20 and its associated mechanism. The nose portion 18 preferably embraces a part of a headlamp housing or casing 22, which may include a lens supporting projection or flange 24, as well as an integral rearwardly extending surface 26 which cooperate to form the front of the housing 22. As will hereinafter appear, the nose portion 18 is formed separately from a body portion 28 which is inclusive of a crown 30, side 32, base 34 and an integrally formed portion 36 serving as the rear of the casing 22. The crown 30 may be of any desired contour, and the shape and area of the side 32 may be arranged to give the desired appearance to the structure.

Figure 3:
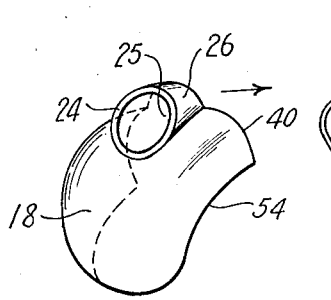
Figure 3 is a perspective view of the "nose" portion of the fender structure.
Figure 4:
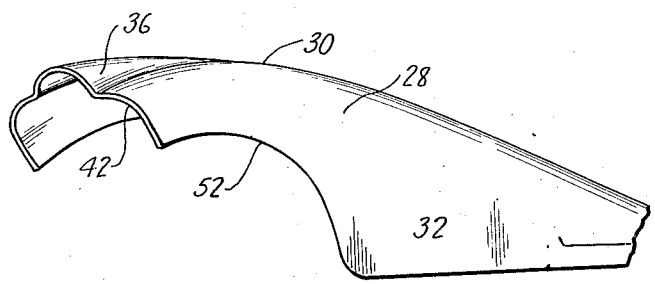
Figure 4 is a perspective view of the body portion of the fender structure.
Figure 5:
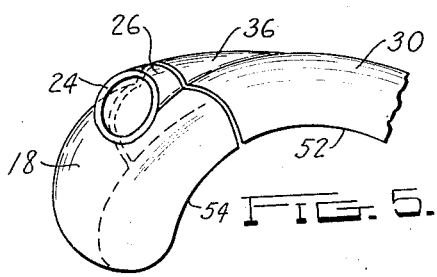
Figure 5 is a fragmentary view of the elements shown in Figures 3 and 4 in position to be secured together.

By forming the nose portion 18 as a separate unit or stamping, such portion may be handled easily and the various operations to effect a finished section performed prior to its union with the body portion 28. For example, after the section is stamped from the sheet material it may be trimmed, flanged and pierced prior to being assembled with the body portion. Thus, as illustrated in Figures 3 and 5, portion 18 is provided with rear edge 40 to which is suitably secured the forward or leading edge 42 of the body portion 28 by means such as by flash or butt welding. This type of welded joint has been illustrated, but it will be clear that any other weld or joint may be used effectively, it being only necessary to prepare the adjoining edges so that such a joint may be employed. When a flash weld is used it is only necessary to grind off the exterior flash of the weld to finish the surface the interior of the weld being retained to stiffen the joint.

To accommodate securing means (not shown) for a headlight lens, the projection 24 is formed by removing a disc-like portion of the material forming the structure to provide an opening 25, and flange 24 may be pierced or otherwise provided with suitable means to retain such a securing means. It will be readily understood that any arrangement for securing a lens as well as other lighting apparatus will be materially affected by the particular design of the fender structure and the type of lighting apparatus used. The angularity of the flange 24 with respect to the horizontal may be altered to suit the design of the fender or vehicle, and this may also be dependent upon the particular type of lighting arrangement.

The body portion 28 is formed with suitable edge portions 46 and 48 enabling the same to be secured to the running board 47 and frame or other support, respectively. The leading edge 42 is shaped to conform with the rear edge of the nose portion when in assembled relation and includes the casing portion 36 projecting upwardly from the crown 30.

The depending or overhanging edges 52 and 54 respectively of the body portion and nose portion may be suitably rolled to remove any sharp edges and to give the structure a finished appearance. It may also be desirable to completely enclose the lighting apparatus and this may be accomplished by securing a suitably formed member to the under surface of the fender structure and adjacent the portions 26 and 36, in which instance the lighting apparatus may be inserted through the opening 25.

As the structure is preferably formed from sheet metal of the desired thickness and character, the body and nose portions are drawn from the sheet material by a suitable die. The use of any suitable machinery capable of performing the stamping, drawing or forming operations is contemplated, the sections being preferably separately formed, due to the fact that the required amount of material for the headlight casing portion may thus be supplied to the two sections without wrinkling or tearing the material.

Referring to Figures 6, 7 and 8, it is to be noted that the form of the invention there shown is inclusive of a combined fender and lamp housing 60 formed of sections 62 and 64 and secured together along a line 66. In this arrangement each of sections 62 and 64 preferably include half of the lamp housing 61, although it is to be understood that the joint may be arranged to the best advantage for ease in stamping or forming and assembly. Section 62 preferably includes a part of the "nose" portion 68 and body portion 69, as does section 64. Section 64 also includes a flange or edge 70 serving as a means to secure the structure to a portion of the vehicle, while each section is formed with a flange 72 to which may be secured the running board of the vehicle. Section 62 includes a depending portion 74 the lower edge of which is preferably rolled as at 75 to strengthen the same as well as enhance the appearance of the completed structure.

The lamp housing sections have inturned flanged portions 76 adjacent the front thereof, which when in assembled relation, provide an opening 78, the flange 76 serving as a means to retain a suitable lighting apparatus with respect to the housing 61. In this form of the invention it will be noted that the sections may be separately formed, trimmed, flanged and pierced, but it is understood that I also contemplate the use of a compound stamping or forming mechanism in which the sections may be formed simultaneously and then severed and the finishing operations performed prior to its final assembly. As in the case of the arrangement shown in Figures 1 to 5, this form of the invention is fabricated from several sections secured together by any desired type of weld or other union along the cooperating edge portions of the sections.

The method of the present invention for producing a unitary fender structure by forming the same from a plurality of sections as herein described permits the use of sheet material of less thickness than the material previously employed. This can be accomplished due to the fact that the material need not be subjected to exceedingly high compression pressures per square inch during the formation process, and therefore the material is not subject to great stresses while taking the proper configuration by the action of the dies which render the fender structure unable to withstand impacts at the curved sections without being deformed, a factor which has necessarily been compensated for in prior methods by using a comparatively thick material.

In addition, by using the method described in the present invention, a comparatively inexpensive fender structure can be produced by using sheet material of low cost which is possible when the sections are made from comparatively small size sheets. Furthermore, by the method of the present invention the amount of material used to produce the structure is reduced to a minimum as the curved portions are of less amplitude with reference to the plane of the sheet material.

It is apparent that, within the scope of the invention, modifications and different arrangements may be made other than is herein disclosed, and the present disclosure is illustrative merely, the invention comprehending all variations thereof.

What I claim is:

1. A combined unitary transversely crowned fender and lamp casing which consists in united complementary sheet metal members, each of said sheet metal members alone being insufficient to form the complete combined fender and lamp casing; one of said members constructed to form a part of both the fender and lamp casing, said lamp casing having a sharp curvature relative to the curvature of the fender, said casing portion located adjacent an edge of said member; said complementary sheet metal member having formed therein another part of the fender and lamp casing, the lamp casing portion of said last mentioned complementary member also being located adjacent an edge portion of said member.

2. A combined unitary transversely crowned fender and headlamp casing which consists of permanently united complementary sheet metal stampings, each of said stampings alone being insufficient to form the complete combined fender and lamp casing; one of said stampings constructed to form a part of both the fender and lamp casing, said lamp casing having a sharp curvature relative to the curvature of the fender, said casing portion located adjacent an edge of said stamping; said complementary sheet metal stamping having formed therein the remainder of the fender and lamp casing, the lamp casing portion of said last mentioned complementary stamping also being located adjacent an edge portion of said stamping.

3. A complemental sheet metal section for a combined transversely crowned fender and headlamp casing located adjacent the crowned portion thereof which is integrally formed with a part of both the fender and lamp casing, said lamp casing portion having a sharp curvature relative to the curvature of the fender portion, and said lamp casing portion located adjacent an edge of said section, said section having a line edge passing therethrough adapted to be united to a complementary section, and said section alone being of insufficient size for the combined fender and lamp casing.

4. A combined unitary transversely crowned fender and headlamp casing which consists in welded complementary sheet metal elements, each of said elements alone being insufficient in size to form the complete combined fender and lamp casing; one of said elements constructed to form integrally a part of both the fender and lamp casing, said lamp casing having a sharp curvature relative to the curvature of the fender portion and said lamp casing portion located adjacent an edge of said element, said element having a welding edge portion; said complementary sheet metal element having formed therein another part of the fender, and having a welding edge portion, said complementary elements being welded along said welding edge portions.

5. A combined unitary transversely crowned fender and headlamp casing located adjacent the crowned portion thereof which consists in welded complementary sheet metal stampings, each of said stampings alone being insufficient in size to form the complete combined fender and lamp casing; one of said stampings constructed to form integrally a part of both the fender and lamp casing, said lamp casing having a sharp curvature relative to the curvature of the fender portion and said lamp casing portion located adjacent an edge of said stamping, said stamping having a welding edge passing through said lamp casing portion; said complementary sheet metal stamping having formed integrally therein another part of the fender and lamp casing, the lamp casing portion thereof being located adjacent an edge portion of said stamping, said stamping having a welding edge passing through said lamp casing portion; said complementary stampings being butt-welded along said welding edges, the welding flash on one side of said completed combined fender and lamp casing being removed to provide a smooth finish.

6. A combined transversely crowned fender and lamp casing which consists of permanently united complementary sheet metal sections, each of said sections alone being insufficient to form the complete combined fender and lamp casing; one of said sections constructed to form integrally a part of both the fender and lamp casing, said lamp casing being located adjacent an edge portion of said section; and each of said sections provided with an edge portion along which said complementary sections are joined, the joint having a smooth outer surface between said complementary sections.

PETER PETERSON.